July 23, 1968
H. F. BORIN
3,393,794
PILL ACCOUNTING DISPENSER
Filed Oct. 25, 1966
2 Sheets-Sheet 1
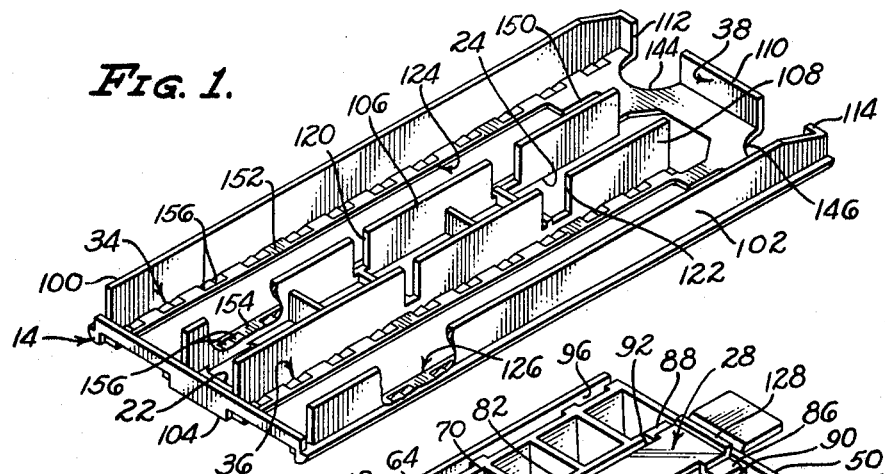
Fig. 1.
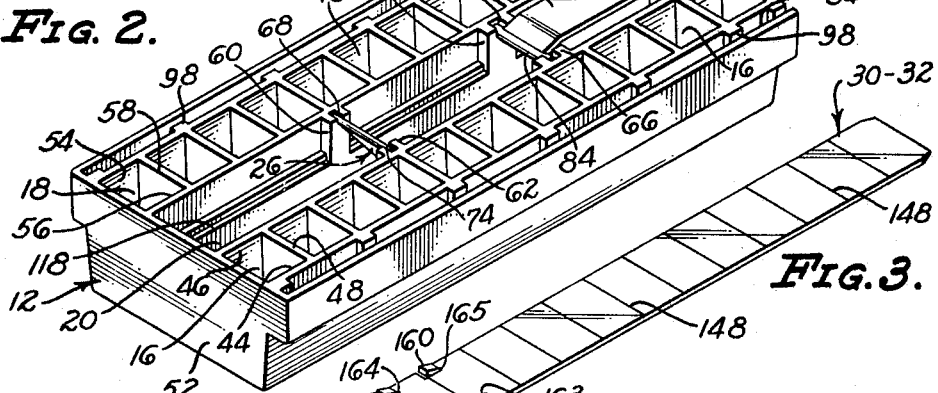
Fig. 2.
Fig. 3.
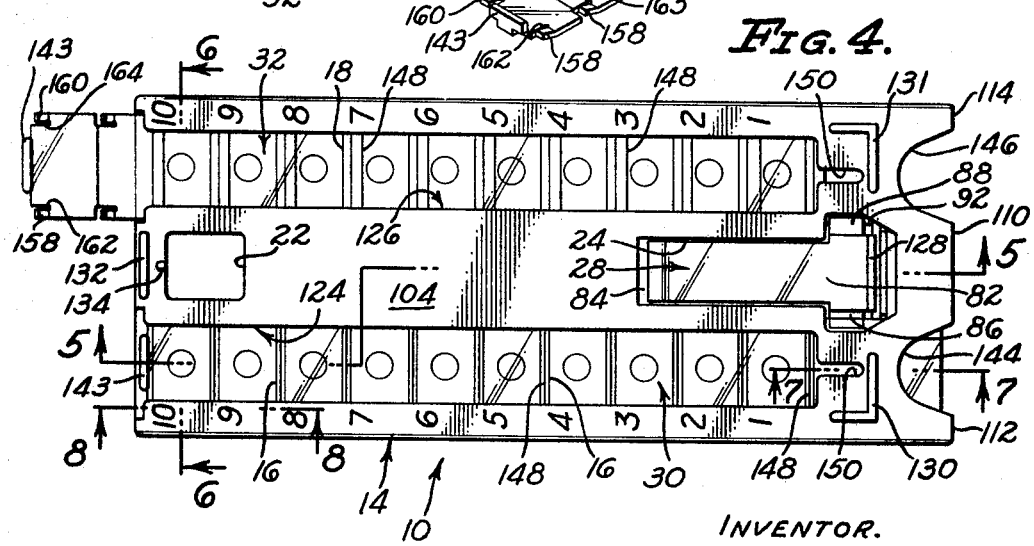
Fig. 4.
INVENTOR.
HARLAN F. BORIN
BY HIS ATTORNEYS.
HARRIS, KIECH, RUSSELL & KERN July 23, 1968     H. F. BORIN     3,393,794
PILL ACCOUNTING DISPENSER
Filed Oct. 25, 1966     2 Sheets-Sheet 2
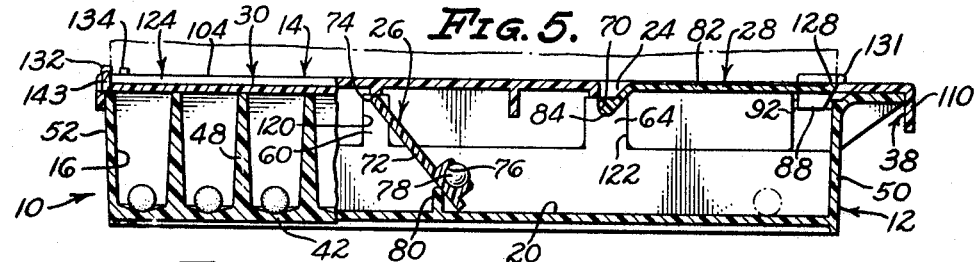
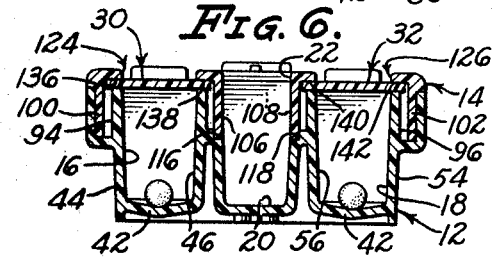
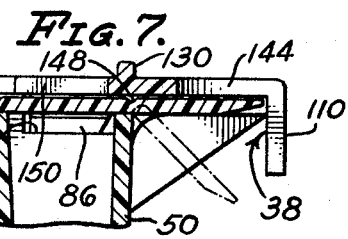
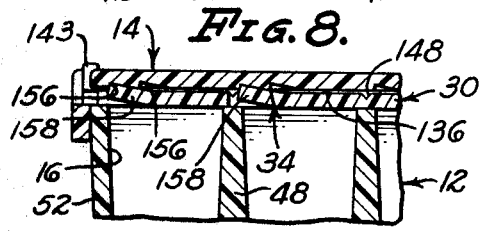
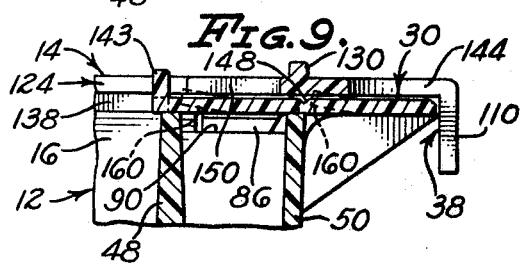
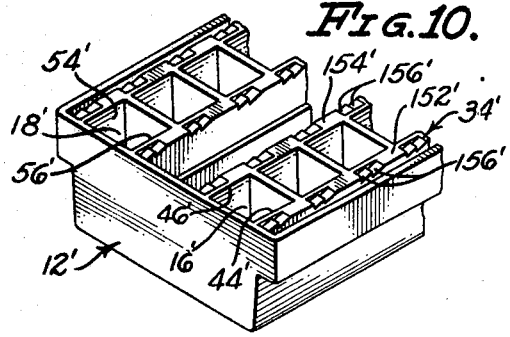
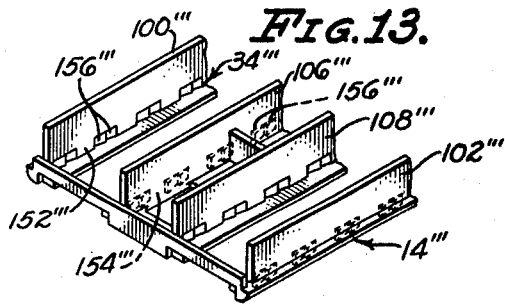
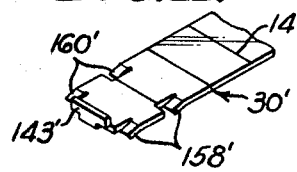
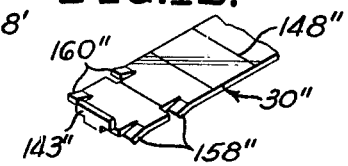
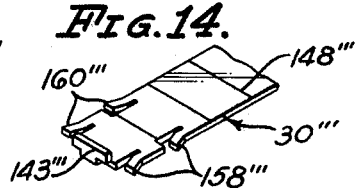
INVENTOR.
HARLAN F. BORIN
BY HIS ATTORNEYS.
HARRIS, KIECH, RUSSELL & KERN

United States Patent Office 3,393,794
Patented July 23, 1968

3,393,794
PILL ACCOUNTING DISPENSER
Harlan F. Borin, 4534 Los Feliz Blvd.,
Los Angeles, Calif. 90027
Filed Oct. 25, 1966, Ser. No. 589,317
10 Claims. (Cl. 206—42)

ABSTRACT OF THE DISCLOSURE

A pill accounting dispenser comprising a series of open compartments covered by a one-way slide member movable through a series of stop positions, means being included for arresting movement of the slide member in each of the stop positions to expose different ones of said compartments and for visually and indestructibly indicating movement of the slide member.

---

The present invention relates to improvements in pill dispensers and, more particularly, to a novel pill dispenser which provides a visual indication of the number of pills contained therein. The pill dispenser of the present invention is particularly useful as a dispenser of narcotic and other pills requiring a strict accounting and to this end includes structural features which prevent unauthorized tampering with and removal of the pills from the dispenser without obvious detection.

In many countries, such as the United States, national or local laws require a strict accounting of all narcotics. This means that pharmacists must keep elaborate records of the location, quantity, and disposition of all narcotics which they receive and dispense.

In hospitals, the usual procedure for the hospital pharmacist is to issue given numbers of different narcotic pills to each nurse's station in the hospital in accordance with the predetermined and medically prescribed needs of the patients serviced from the station. The pills of different types and potency are stored in different bottles which are retained in a locked safe at each nurse's station.

Regulations require that the narcotic pills be accounted for at the beginning and end of each shift of nurses, that is, at the beginning and end of each eight-hour period. In practice, it is rather difficult to count pills while stored in a bottle. Furthermore, there may be sixty or more bottles of narcotic pills at each nurse's station. Therefore the counting of narcotic pills often becomes a very time-consuming and laborious task for the nurse and necessarily occupies time which she could otherwise be spending with her patients.

In addition, the bottles containing the narcotic pills are very easy to open. Thus, from the time the pills leave the pharmacy until they are placed in the locked safe at a nurse's station substitution of pills may be made without detection. Furthermore, once a thief gains access to the locked safe, it is a simple matter to remove a number of narcotic pills and to substitute harmless pills of similar size and color therefor and thereby avoid detection.

Another problem presented to the nurse is what to do with unused pills, that is, pills taken to a patient but not consumed—as for example when the patient is asleep. The nurse is not permitted to dispose of the unused pill. Therefore, she must return the pill to a separate container at the nurse's station and report it as being returned. Unused pills, therefore, increase the nurse's clerical responsibility and further detract from the time which she could otherwise spend with her patients.

In view of the foregoing problems, it is an object of the present invention to provide a pill dispenser in which the pills may be simply and rapidly counted and from which pills cannot be removed without providing an indication of their removal.

Another object of the present invention is to provide a pill dispenser of the foregoing character including separate and viewable compartments for each pill and a unidirectionally movable slide member for covering the compartments and for moving between and through a series of stop positions to successively expose different ones of the compartments and the pills therein.

A further object of the present invention is to provide a pill dispenser of the foregoing character which includes a separate viewable compartment for receiving unused pills, the separate compartment allowing pills to be freely introduced thereto but preventing the unauthorized and undetected removal of pills therefrom.

Still another object of the present invention is to provide a pill dispenser with the foregoing type of unused pill compartment which is locked closed by the slide member and remains closed till the slide member has passed through the last of its stop positions, thereby permitting removal of the unused pills only after all other pills have been dispensed and then only in a manner which provides a visual indication that the unused pill compartment has been opened.

The foregoing as well as other objects and advantages of the present invention may be more clearly understood by reference to the following detailed description when considered with the drawings which, by way of example only, illustrate a pill dispenser embodying the features of the present invention.

In the drawings:

FIG. 1 is a perspective view of a cover or top member of the pill dispenser, the cover member being inverted in FIG. 1 and portions thereof being removed to more clearly illustrate its structure;

FIG. 2 is a perspective view of a container or bottom member of the pill dispenser including two series of pill-storing compartments and a central unused pill compartment;

FIG. 3 is a perspective view of one form of slide member employed in the pill dispenser of the present invention;

FIG. 4 is a top or plan view of the pill dispenser in an assembled form;

FIG. 5 is a sectional view taken along the line 5—5 in FIG. 4 illustrating the inner construction of the pill dispenser;

FIG. 6 is a sectional view taken along the line 6—6 in FIG. 4 illustrating the relationship between the pill-storing compartments and the unused pill compartment;

FIG. 7 is a fragmentary sectional view taken along the line 7—7 in FIG. 4 illustrating the manner in which motion of the slide member is arrested in each of a plurality of stop positions to consecutively expose different ones of the compartments in the pill dispenser;

FIG. 8 is a fragmentary sectional view taken along the line 8—8 in FIG. 4 illustrating a one-way ratchet included in the pill dispenser to permit only unidirectional movement of the slide member over the compartments between the plurality of stop positions;

FIG. 9 is a fragmentary sectional view similar to FIG. 7 with the slide member in its last stop position exposing all pill-storing compartments in the left-hand series of compartments;

FIG. 10 is a perspective view of a rear portion of a modified container wherein the rack for the one-way ratchet is included in the container along opposite sides of the series of compartments rather than in the cover member as illustrated in FIG. 1;

FIG. 11 is a perspective view of an end portion of a slide member designed to function with the container illustrated in FIG. 10 wherein the pawls on the slide member extend downwardly to ride into the teeth of the rack on the container;

FIG. 12 is a perspective view of an end portion of a different form of slide wherein the pawls on one side of the slide extend in an upward direction and the pawls on the opposite side extend in a downward direction to allow the slide to function in a pill dispenser where one of the racks is included in the container and another rack is included in the cover;

FIG. 13 is a perspective view, looking from the bottom, of a portion of a modified cover member wherein the racks are included in the sides of vertical members adapted to fit into the associated container; and FIG. 14 is a perspective view of a portion of a slide designed to function in a pill dispenser including the cover of FIG. 13.

In the drawings, the pill accounting dispenser is represented by the numeral 10 and generally speaking includes a container 12 having a cover 14 and two separate and parallel series of identical open compartments 16 and 18 and an elongated central compartment 20 between the two series of compartments.

The compartments 16 and 18 are designed to separately receive and store pills while the compartment 20 is designed to receive and store pills which are unused after being dispensed from the container. To this end, the compartment 20 includes an entry port 22 through the cover 14 as well as an exit port 24 also through the cover. The entry port 22 is closed by a valve 26 within the compartment 20 while the exit port is normally closed by a valve 28. The valve 26 is designed to permit free entry of unused pills into the compartment 20 but to prevent their exit through the entry port 22. The valve 28, on the other hand, is releasably locked to prevent the unauthorized exit of unused pills from the compartment 20.

The series of compartments 16 and 18 are adapted to be covered by transparent slide members 30 and 32, which, in turn, are designed to move in one direction over the compartments through a series of stop positions to successively expose different ones of the compartments. In this regard, the dispenser 10 includes one-way ratchets 34 and 36 for preventing movement of the slide members 30 and 32 in a direction opposite the one direction and stop means 38 for arresting movement of the slide members in each of the stop positions. The slide members 30 and 32 also cooperate with the valve 28 to lock the valve closed when the slide members are in or are moving through the series of stop positions. Thus, the valve 28 is only permitted to open after both slide members have passed through the last ones of the stop positions, that is, after all pills have been dispensed from the compartments 16 and 18.

In the foregoing manner, the dispenser 10 provides means for separately storing a plurality of pills within clear view of a nurse for simple and rapid counting. The dispenser also provides a store from which pills cannot be removed without providing an indication of their removal. Furthermore, the pill dispenser 10 includes a separate viewable compartment which permits unused pills to be freely introduced thereto while preventing the unauthorized and undetected removal of pills therefrom.

In the preferred form of the dispenser 10, the bottom portion of the container 12 is a single-piece molded plastic having cavities therein forming the series of compartments 16 and 18 and the central compartment 20. More particularly, the series of compartments 16 are closed on the bottom, left and right sides by bottom, outside left, and inner left walls 42, 44, and 46, respectively, and are bounded on the front and rear by a plurality of spaced, vertically and laterally extending partitions 48 and by outside front and rear walls 50 and 52 of the container.

Similarly, the series of compartments 18 are closed on the bottom, left, and right sides by bottom, outside right, and inner right walls 42, 54, and 56, and are bounded on the front and rear by a plurality of spaced, vertically and laterally extending partitions 58 and by the front and rear walls of the container.

The compartment 20 is bounded by the front and rear walls of the container and by the inner left and right side walls 46 and 56 within the container.

Within the compartment 20, the inner left and right walls 46 and 56 include two pairs of laterally aligned, vertically extending posts 60, 62 and 64, 66. The posts 60, 62 and 64, 66 are spaced equally from the rear and front walls, respectively, and include aligned arcuate top recesses 68 and 70 for receiving and supporting the valve means 26 and 28, respectively.

As previously indicated, the valve means 26 is designed to allow free entry of unused pills but to prevent their exit through the entry of unused pills but to prevent their exit through the entry port 22. Various devices may be utilized to accomplish this purpose. Therefore, it is by way of example only that the illustrated valve means 26 comprises a door 72 extending substantially the width of the compartment 20 and having rod-shaped arms 74 extending laterally and outwardly from an upper end of the door. The arms 74 are adapted to rest in the recesses 68 and to thereby support the door 72 for vertical swinging movement within the compartment 20. The lower portion of the door 72 includes a socket 76 securely holding a metal ball 78 for continuously urging the door toward the closed position illustrated in FIG. 5 with the lower end of the door 72 engaging the bottom wall 42 of the container and the rear side of the door bearing against a pill-blocking vertical ridge 80 extending the width of the compartment 20.

Thus, arranged, the door 72 is free to swing vertically to an open position as the rear end of the container 12 is tilted upward, thereby allowing a pill dropped through the entry port 22 to pass through the open valve means. On the other hand, when the rear end of the container is tilted downward causing the unused pills to flow forward toward the door 72, the metal ball 78 acts upon the door 72 to swing the door to the tightly closed position against the bottom wall of the container and the ridge 80. In the closed position, the door blocks the exit of pills through the entry port 22.

As previously indicated, the valve means 28 is designed to be releasably locked and to prevent the unauthorized exit of pills from the compartment through the exit port 24. To accomplish this, the valve means 28 may take various forms. Therefore, it is by way of example only that the valve means 28 is illustrated as comprising a transparent door 82 extending substantially the width of the compartment 20 and the length of the exit port 24. A rod 84 is connected to and extends along a downwardly flanged rear end portion of the door 82 and ends of the rod extend laterally from the sides of the door and rest firmly in the recesses 70 of the posts 64, 66. The rod 84 and recesses 70 thus support the door 82 for vertical swinging movement from a closed position over the exit port 24 to a raised and open position above the exit port.

To define the closed position, ear members 86 and 88 extend laterally from and below the right and left sides of a raised flat central portion of the door 82 and rest upon the inner walls 46 and 56 in depressions 90 and 92, respectively. The depressions 90 and 92 are located immediately adjacent the front wall 50 of the container and are deep enough to insure that the tops of the ear members 86 and 88 lie just below the top of the inner walls 46 and 56 when seated within the depressions. As will be hereinafter described, the structural arrangement of the ear members relative to the depressions 90 and 92 allows the door 82 to be releasably locked by the slide members 30 and 32 when stationed over and along the series of compartments 16 and 18. When locked by the slide members, the door 82 blocks the exit port 24 and prevents unauthorized removal of unused pills from the compartment 20.

In addition to the cavities forming the compartments 16, 18, and 20, the bottom portion of the container 12 includes elongated cavities defining top channels 94 and 96 in the outer left and right walls 44 and 54. The top channels 94 and 96 extend the length of the container 12 and have open front ends and a plurality of spaced vertical ribs 98. Thus constructed, the top channels 94 and 96 are adapted to tightly receive parallel, left and right side vertical members 100 and 102 extending downwardly from a top 104 of the cover member 14. The vertical ribs 98 press tightly against the vertical members 100 and 102 which, with the top 104 of the plastic cover member 14, are heat-sealed to the bottom of the plastic container 12 in the final stages of the dispenser construction. In addition to the vertical members 100 and 102, and as will be described in order, the cover member 14 includes parallel, right and left side inner vertical members 106 and 108; laterally extending central, left, and right side flanges 110, 112, and 114; the previously referred to entry and exit ports 22 and 24 to the central compartment 20; means enabling identical pill dispensers to be securely stacked on the top of the dispenser 10; and elongated, generally rectangular openings 124 and 126 exposing the compartments 16 and 18, respectively.

The vertical members 106 and 108 are adapted to fit within the central compartment 20 along the inner walls 46 and 56 and to rest upon horizontal shoulders 116 and 118 in the inner walls (see FIG. 6). To this end, the inner vertical members 106 and 108 include two pairs of aligned notches 120 and 122 for receiving the vertical posts 60, 62 and 64, 66, respectively. When the vertical members 100, 102, 106, and 108 extend into and are seated in the bottom portion of the container 12, the cover member 14 is secured to the container and the top 104 covers the recesses 68 and 70 to prevent the arms 74 and rod 84 from becoming dislodged therefrom during opening and closing operation of the valve means 26 and 28.

Further, when the cover member 14 is secured to the container 12, the central, left, and right side flanges 110, 112, and 114 extend downwardly from a forward end of the cover member 14 and laterally inward beyond the sides of the series of compartments 16 and 18. As will hereinafter be described, the laterally extending flanges thus act as stops for the forward end of the slide members 30 and 32 and combine therewith to define the stop means 38 for arresting motion of the slide members in each of the previously referred to stop positions (see FIGS. 7 and 9).

As illustrated most clearly in FIG. 4, the entry port 22 is generally rectangular in shape and lies adjacent a rear end of the cover member 14 to allow unused pills to be dropped into the compartment 20 to the rear of the valve means 26. The container 12 therefore must be tilted to open the valve means 26 and to cause the pills to roll forward through the valve means for capture in a front portion of the compartment 20.

The exit port 24 is generally T-shaped and lies adjacent the front end of the cover member to expose the flat central portion and laterally extending ears of the door 82. The exit port 24 thus permits upward swinging movement of the door 82, as by grasping and lifting upward on a flange 128 at the front end of the door.

The means on the cover member 14 enabling an identical pill dispenser to be stacked on top of the dispenser 10 includes opposing L-shaped angle members 130 and 131 adjacent a front of the cover member 14 for receiving front edges of the bottom of the identical dispenser, and a lateral ridge 132 and small button 134 extending vertically from the cover member immediately behind the entry port 22. The ridge 132 is adapted to engage a rear edge of the identical container while the button 134 is adapted to tightly fit between a pair of buttons (not shown) on the identical dispenser. The identical dispenser is indicated in phantom outline in FIG. 5 as stacked on top of the cover member 14.

The elongated rectangular openings 124 and 126 extend from the rear of the cover member 114 to fully expose the series of compartments 16 and 18. In this regard, the right and left edges of the openings 124 and 126 extend along the inside surfaces of right and left walls of the compartments 16 and 18, and the top 104 of the cover member 14 is spaced from the top surfaces of the right and left walls to define laterally extending parallel channels 136, 138 and 140, 142 along the sides of the compartments. The channels 136, 138 and 140, 142 are designed to slidably receive the slide members 30 and 32 with the marginal edges of the top 104 along the openings 124 and 126 covering the marginal right and left sides of the slide members to prevent vertical lifting of the slide members from the container once the slide members are inserted in the channels (see FIG. 6).

As previously indicated, the slide members 30 and 32 are designed to move in one direction over the compartments 16 and 18 through a series of stop positions and to thereby successively expose different ones of the compartments in each series.

Slide members for performing the foregoing functions may be of identical structure and may take various forms, such as those illustrated in FIGS. 3, 11, 12, and 14 comprising elongated strips of a relatively thin, flexible, transparent plastic material dimensioned to slide along the compartment with marginal edges in the channels 136, 138 and 140, 142. Since the slide members 30 and 32, like the door 82, are formed of transparent material, the contents of each of the compartments 16, 18, and 20 are readily viewable when the dispenser is held in an upright position. To assist in the counting of the pills when viewed through the slide members 30 and 32, the cover member 14 carries a series of numerals "1"–"10" along the series of compartments 16 and 18, a different numeral being associated with each compartment.

To aid in the easy entry of the slide members 30 and 32 into the channels 136, 138 and 140 and 142, the front end of each slide member is tapered as illustrated in FIGS. 3 and 7. In addition, the rear end of each slide member includes an upwardly extending tab 143 which may be easily gripped by the nurse operating the dispenser to permit the nurse to easily move the slide members between and through the series of stop positions to successively expose different ones of the compartments.

In this regard, and as previously indicated, the lateral flanges 110, 112, and 114 located at the front end of the cover member 14 act as stops for limiting movement of the slide members 30 and 32 in a forward direction along the compartments. In addition, the flanges combine with the ends of the slide members to define the stop means 38 for arresting movement of the slide members in each of the stop positions.

The stop action of the lateral flanges 110 and 112 is most clearly illustrated in FIGS. 4, 7, and 9 for the slide member 30. As there indicated, when the slide member 30 is inserted into the channels 136 and 138 to cover all of the series of compartments 16, a forward end of the slide member extends over and beyond a front end of the container 12 to engage the lateral flanges 110 and 112. The forward end of the slide member also is exposed by a cut-out 144 in a forward end of the cover member 14, the cover member also extending over and forward of the container. A similar cut-out 146 exposes the forward end of the slide member 32 when inserted into the dispenser to cover the series of compartments 18.

When the forward end of the slide member 30 is against the flanges 110 and 112, the slide member is said to be in a stop position. The position of the slide member 30 illustrated in FIGS. 4 and 7 is a first stop position for the slide member with the slide member covering all compartments 16. Subsequent stop positions are defined by ends of the slide member 30 formed upon a fracturing and breaking off of the portions of the slide member exposed through the cut-out 144 followed by a forward movement of the slide member to bring the new end of the slide member against the flanges. In this regard, the slide member 30 is fracturable along parallel grooves 148 in the top side of the slide member transverse to its direction of movement. The spacing of the grooves 148 from the forward end of the slide member 30 is the reverse of the spacing of the compartments 16 from the front end of the container to insure that movement of the slide member between consecutive stop positions fully exposes successive compartments. In the illustrated example of the container, the compartments 16 are of equal dimension. Therefore, the grooves 148 are equally spaced and the spacing is equal to that of the compartments 16.

With the foregoing in mind, and with reference to FIG. 7, when it is desired to expose the rearmost compartment 16 and to move the slide member 30 to its second stop position, the nurse handling the dispenser simply places her thumb on top of the exposed forward end of the slide member, and presses downward. The downward pressure easily fractures the slide member 30 along the first groove 148 to break off a forward portion of the slide member as illustrated in FIG. 7. The nurse then grasps the vertical tab 143 on the rear end of the slide member 30 and moves the slide member forward until the new end of the slide member bears against the flanges 110 and 112. The rearmost compartment bearing the numeral 10 is then exposed and the contents of the compartment may be removed simply by turning the dispenser over.

As it is desired to remove successive pills from the compartment 16, the foregoing operation of fracturing the slide member 30 and moving the slide member forward is repeated to successively move the slide member through the series of stop positions to successively expose the different compartments 16 and the contents thereof. Since forward movement of the slide member to expose successive compartments requires a fracturing and breaking off of portions of the slide member 30, and since rearward movement of the slide member 30 is prevented in a manner to be hereinafter described, pills cannot be removed from the dispenser without providing a visible indication of their removal. In this manner, the dispenser 10 prevents unauthorized tampering with the contents and undetected thefts of pills.

As previously indicated, not only do the slide members 30 and 32 provide a cover for the compartments 16 and 18, but they also provide means for releasably locking the valve means 28 and preventing the opening of the door 82 until both slide members have been moved through all stop positions and all pills have been dispensed from the compartments 16 and 18. In this regard, the slide members 30 and 32 in riding in the channels 136, 138 and 140, 142 pass over the ear members 86 and 88 stationed in the depressions 90 and 92, respectively. So long as the marginal edges of the slide members 30 and 32 ride over the ear members, the door 82 remains locked and access cannot be had to unused pills located in the compartment 20.

It is a further feature of the slide members 30 and 32 that even though the slide members are moved through their series of stop positions and all pills have been dispensed from the dispenser, entrance may not be had to the compartment 20 without providing a visual indication of such entrance. In this regard, and as illustrated most clearly in FIG. 9, when the slide member 30 has passed through the series of stop positions, the tab 143 lies adjacent an end of the rectangular opening 124. Therefore, despite the fracturing and breaking off of the forwardmost end of the slide member 30, the balance of the slide member is prevented from moving forward by the tab. The tab 143, however, is fracturable from the slide member and once broken off allows the balance of the slide member to be moved forward and out of the dispenser. As the last of the slide member 30 is removed from the dispenser, for example by pushing the slide member forward with a pointed object and along a slot 150 at the forward end of the opening 124, the slide member moves from the ear member 86. If the slide member 32 is also completely removed from the dispenser 10, then the door 82 is free to swing upwardly to expose the contents of the compartment 20. Breaking off of the tab 143 and the complete removal of the slides 30 and 32, however, provides an indication that the contents of the compartment 20 have been removed.

As previously indicated, once the slide members 30 and 32 are inserted fully into the dispenser 10 over the compartments 16 and 18, they are only movable in a forward direction through the series of stop positions. To prevent rearward movement of the slide members which might allow unauthorized and undetected tampering with the contents of the dispenser 10, the dispenser includes the one-way ratchets 34 and 36 for the slide members 30 and 32, respectively. The ratchets 34 and 36 may take various forms, such as those illustrated in FIGS. 1, 2, 3, and 8, or FIGS. 10 and 11, or FIGS. 13 and 14, and may be identical in structure. Therefore, only the ratchet 34 will be described in detail herein.

In the form of the one-way ratchet 34 illustrated in FIGS. 1, 2, 3, and 8, the ratchet includes two racks 152 and 154 including equally spaced pairs of teeth 156. The teeth of the rack 152 are included in the lower surface of the top 104 of the cover member 14 along the inside of the vertical member 100 while the teeth of the rack 154 are included in the lower surface of the top member along the left side of the vertical member 106. The teeth are spaced from each other and each pair is associated with a different compartment 16 in the container 12.

In addition to the racks 152 and 154, the ratchet 34 includes two pairs of pawls 158 and 160 at the rear end of the slide member 30. The pawls 158 take the form of upwardly extending tabs defined by slots 162 and 163 in the left side of slide member and are designed to ride forward into the teeth 156 of the rack 152. Similarly, the pawls 160 take the form of upwardly extending tabs defined by slots 164 and 165 in the right side of the slide member and are adapted to ride forward into the teeth 156 of the rack 154.

As illustrated most clearly in FIGS. 8 and 9, the pairs of teeth 156 are spaced relative to each other and to the pawls 158 and 160 such that the pawls engage rearmost ones of the first two pairs of teeth when the slide member is in the first stop position, engage the rearmost ones of the second and third pairs of teeth when the slide member is in the second stop position, and so on. The pawls, in engaging the teeth 156, prevent movement of the slide member in a rearward direction to guard against unauthorized personnel tampering with the dispenser by sliding the slide member 30 in a rearward direction, removing pills, substituting harmless pills therefor, and thereby avoiding immediate detection.

The forwardmost tooth of each pair of teeth 156 is provided to further insure against tampering with the dispenser as by bending, but not breaking, the exposed forward end of the dispenser and sliding the slide member slightly forward to expose a portion of the rearmost compartment and the pill therein. If, for example, such movement of the slide member is accomplished when the slide 30 is in the first stop position, then the pawls 158 and 160 move from the rearmost to the forwardmost ones of the first two pairs of teeth in the racks 152 and 154, lock and prevent rearward movement of the slide member to recover the rearmost compartment. The forwardmost teeth of the other pairs of teeth provide a similar function when the slide member is in other stop positions. Therefore, only forward movement of the slide is possible with its accompanying breaking of the forward end of the slide member to provide an indication of unauthorized tampering with the dispenser.

Similar structure is provided for the ratchet 36. Also, rather than including two racks, one rack may suffice for some dispensers.

Alternate forms of racks and pawls are illustrated in FIGS. 10 through 14. The racks and pawls are similar to those previously described in connection with FIGS.

1, 2, 3, and 8. Therefore, similar reference numerals with a prime, double prime, and triple prime notation will be employed in FIGS. 10 through 14 to designate like elements of the racks and pawls.

In FIGS. 10 and 11, a form of the ratchet 34' is depicted wherein the racks 152' and 154' are included in the upper surface of the left outside wall 42 and left inside wall 46. The pairs of pawls 158' and 160' extend downwardly rather than upwardly to engage the teeth 156' of the racks 152' and 154' and operation of the ratchet 34' is as previously described to prevent rearward movement of the slide 30.

An alternate arrangement for the pawls 158" and 160" is illustrated in FIG. 12 wherein the left-hand pawls extend in a downward direction and the right-hand pawls in an upward direction. The racks for functioning with such a pawl arrangement would necessarily require that the left-hand rack be located in the left outer wall of the container and that the teeth thereof extend in a downward direction, and that the right-hand rack be located in the cover member (as in FIG. 1) and that the teeth thereof extend upwardly into the cover member. Such an arrangement would have the advantage of preventing unauthorized personnel from lifting or depressing the slide 30 as with a knife to disengage the pawls from the racks and thereby permit unauthorized rearward movement of the slide member.

Still another form of the ratchet 34''' is illustrated in FIGS. 13 and 14 wherein the racks 152''' and 154''' are included in the vertical members 100 and 106 immediately adjacent the inner surface of the top 104 of the cover member 14. The pairs of pawls 158''' and 160''' extend outwardly from the left and right sides of the slide member 30 to engage the teeth 156''' of the racks and allow the ratchet 34''' to function in the manner previously described, preventing rearward movement of the slide member 30.

From the foregoing, it is appreciated that the present invention provides a pill dispenser in which the pills may be simply and rapidly counted and from which pills cannot be removed without providing an indication of their removal.

In use, the pharmacist simply fills the dispenser 10 by inserting a pill in each of the compartments 16 and 18. He then inserts the slide members 30 and 32, moving them to the first stop position, locking the unused pill compartment in the process. The dispenser is then labeled and transported to the nurse's station for dispensing in accordance with the medically prescribed needs of a patient serviced from the station. As the patient requires a pill, the nurse simply breaks off a forward end portion of one of the slide members, moves the slide member forward, and removes the pill. This process is repeated for each pill to be dispensed. Should a pill be unused, the nurse then returns the pill to the compartment 20.

At any given time and at the end of each nurse's shift, it is a simple matter for the nurse to quickly count all pills in the dispenser by tilting the dispenser. In a tilted position, all pills in the compartments 16 and 18 are readily viewable as are any pills which may have been inserted into the unused pill compartment 20. The use of the dispenser 10 thereby materially shortens the counting procedures of narcotic pills in hospitals and also provides a dispenser wherein pills may not be removed without providing a visual indication of the removal. This prevents unauthorized tampering with and undetected thefts of narcotic pills.

When all pills have been dispensed from the compartments 16 and 18, or at any given time, the dispenser 10 may be returned to the hospital pharmacist for disposal of unused pills and refilling. Upon receiving the dispenser, the pharmacist therefore breaks off the tab 143, removes the balance of the slide members 30 and 32, opens the door 82 and removes any unused pills. The dispenser is then imediately ready for refilling by the placement of separate pills in each compartment 16 and 18 and by the insertion of new slide members into the container over the compartments.

While a particular form of pill dispenser has been described in some detail herein, changes and modifications may be made in the illustrated form without departing from the spirit of the invention. It is therefore intended that the present invention be limited in scope only by the terms of the following claims.

I claim:
1. A pill accounting dispenser, comprising:
 a container including a series of open compartments for storing pills;
 a slide member for closing said compartments;
 means mounting said slide member for sliding movement in one direction along said container through a series of stop positions to consecutively expose different ones of said compartments and the contents thereof for dispensing from said container;
 means for preventing movement of said slide member relative to said container in a direction opposite said one direction; and
 manually releasable means for arresting movement of said slide member in each of said stop positions and for visually and indestructibly indicating movement of the slide member.

2. The dispenser of claim 1 wherein said means for preventing movement of said slide member in said opposite direction includes means on said container and said slide member defining a one-way ratchet.

3. A pill accounting dispenser, comprising:
 a container including a series of open compartments for storing pills;
 a slide member for closing said compartments;
 means mounting said slide member for sliding movement in one direction along said container through a series of stop positions to consecutively expose different ones of said compartments and the contents thereof for dispensing from said container;
 means for preventing movement of said slide member relative to said container in a direction opposite said one direction;
 means for arresting movement of said slide member in each of said stop positions;
 a separate compartment in said container for unused pills, said separate compartment having a pill entry port and a pill exit port;
 first valve means over said entry port, said first valve means permitting unidirectional flow of pills therethrough by only opening to permit entry of unused pills into said separate compartment and for otherwise closing to prevent exit of pills through said entry port;
 second valve means over and blocking said exit port to prevent the exit of pills from said separate compartment; and
 lock means responsive to the position of said slide member on said container for locking said second valve means closed when said slide member is in, and as said slide member moves through, said series of stop positions and for unlocking after said slide member has passed through said series of stop positions to permit exit of said unused pills from said separate compartment.

4. The dispenser of claim 3 wherein said second valve means comprises a door supported for swinging movement over said exit port and said lock means includes a portion of said slide member riding over a portion of said door to prevent swinging movement of said door and to prevent opening of said exit port, said portion of said slide member passing from said portion of said door as its slide member leaves a last one of said stop positions.

5. The dispenser of claim 4 wherein said first valve means includes a second door supported for swinging movement over said entry port to open when a pill is introduced to said separate compartment and means on said second door for automatically closing said second door to prevent exit of said pill from said separate compartment.

6. A pill accounting dispenser, comprising:
a container including a series of open compartments for storing pills;
an elongated flat slide member for covering said open compartments, said slide member being fracturable along a plurality of different spaced lateral lines, the spacing of said lines being the reverse of the spacing of said compartments;
means mounting said slide member for sliding movement in one direction along said container through a series of stop positions to consecutively expose different ones of said compartments and the contents thereof for dispensing from said container;
means for preventing movement of said slide member relative to said container in a direction opposite said one direction; and
means for arresting movement of said slide member in each of said stop positions including a stop for engaging an end of said slide member to prevent movement of said slide member in said one direction, whereby the fracturing of said slide member along successive ones of said lines from said one end permits movement of said slide member in said one direction through said series of stop positions.

7. The dispenser of claim 6 wherein said slide member includes a lateral grove along each of said lines to permit said slide to be selectively fractured therealong.

8. A pill accounting dispenser comprising:
a container including a first and a second series of open compartments for storing pills, said first and second series being laterally spaced from and substantially parallel to each other;
a first slide member for closing said first series of compartments;
means mounting said first slide member for sliding movement in one direction along said container through an associated series of stop positions to consecutively expose different ones of said compartments in said first series and the contents thereof for dispensing from said container;
means for preventing movement of said first slide member relative to said container in a direction opposite said one direction;
means for arresting movement of said first slide member in each of its associated stop positions;
a second slide member closing said second series of compartments;
means mounting said second slide member for sliding movement in one direction along said container through an associated series of stop positions to consecutively expose different ones of the compartments of said second series of compartments and the contents thereof;
means for preventing movement of said second slide member relative to said container in a direction opposite said one direction;
means for arresting movement of said second slide member in each of its associated stop positions;
a separate compartment in said container located between said first and second series of compartments for receiving and storing unused pills, said separate compartment having a pill entry port and a pill exit port;
first valve means over said entry port, said first valve means permitting unidirectional flow of pills therethrough by only opening to permit entry of unused pills into said separate compartment and otherwise closing to prevent exit of pills through said entry port;
second valve means over and blocking said exit port to prevent exit of pills from said separate compartment; and
lock means responsive to the position of said first and second slide members for locking said second valve means closed when either of said slide members is in or moving through its associated series of stop positions and for unlocking after both of said slide members have passed through their associated series of stop positions to permit exit of unused pills from said separate compartment.

9. The dispenser of claim 8 wherein:
said second valve means includes a door supported for swinging movement over said exit port; and
said lock means includes portions of said first and second slide members riding over portions of said door to prevent swinging movement of said door and to prevent the opening of said exit port, said portions of said slide members passing from said portions of said door as said slide members leave last ones of said stop positions.

10. The dispenser of claim 9 wherein:
said first and second slide members comprise elongated flat slide members for covering said first and second series of open compartments, respectively, and for sliding through said series of stop positions along said compartments to consecutively expose different ones of said compartments, said flat slide members being fracturable along pluralities of different spaced lateral lines, the spacing of said lines being the reverse of the spacing of said series of compartments associated therewith;
said means for arresting movement of said first and second slide members includes stops for engaging one end of said first and second slide members to prevent movement of said slide members in said one direction, whereby the fracturing of said slide members along successive ones of said lines from said one end permits movement of said slide members in said one direction through said series of stop positions;
said means mounting said slide members for sliding movement in said one direction along said container through said series of stop positions comprise channels in said container along opposite sides of said first and second series of compartments for receiving marginal edges of said first and second slide members; and
said means for preventing movement of said first and second slide members relative to said container in said opposite direction comprise first and second one-way ratchet means, respectively, including a ratchet in at least one of the channels along each of said series of compartments and pawl means on said first and second slide members for riding along an associated one of said ratchets.

References Cited

UNITED STATES PATENTS

| 1,286,810 | 12/1918 | Sheppard | 221—91 |
| 2,411,471 | 11/1946 | Sherman | 206—42 |
| 2,828,005 | 3/1958 | Ricke | 221—4 |
| 3,180,697 | 4/1965 | Mulch | 220—41 X |
| 3,262,747 | 7/1966 | Kotzek et al. | 220—41 X |

SAMUEL F. COLEMAN, *Primary Examiner.*